US012397405B2

(12) United States Patent
Crane

(10) Patent No.: US 12,397,405 B2
(45) Date of Patent: Aug. 26, 2025

(54) HAMMER BIT BARREL ADAPTOR

(71) Applicant: KANAWHA STONE COMPANY, INC., Poca, WV (US)

(72) Inventor: Daniel Alstin Crane, Crawley, WV (US)

( * ) Notice: Subject to any disclaimer, the term of this patent is extended or adjusted under 35 U.S.C. 154(b) by 0 days.

(21) Appl. No.: 18/631,277

(22) Filed: Apr. 10, 2024

(65) Prior Publication Data

US 2024/0335932 A1 Oct. 10, 2024

Related U.S. Application Data

(60) Provisional application No. 63/495,158, filed on Apr. 10, 2023.

(51) Int. Cl.
*B25D 17/06* (2006.01)

(52) U.S. Cl.
CPC .................................... *B25D 17/06* (2013.01)

(58) Field of Classification Search
CPC ................................ B25D 17/02; B25D 17/06
See application file for complete search history.

(56) References Cited

U.S. PATENT DOCUMENTS 2,654,573 A * 10/1953 Annesley ................ E21B 17/04 175/425
2,951,300 A * 9/1960 Ratkowski ............ E02F 9/2841 37/457
3,027,953 A * 4/1962 Coski ..................... B25D 17/02 175/425
3,106,256 A * 10/1963 Mcbride ................. F16B 2/243 411/352
3,830,135 A * 8/1974 Sullivan ................ B23B 31/202 409/234
4,007,795 A * 2/1977 Gawron ................ B25B 21/007 175/414
4,202,557 A * 5/1980 Haussmann ......... B25D 17/088 279/19.5
4,451,093 A * 5/1984 Perez ...................... E21B 10/56 175/426
4,848,013 A * 7/1989 Bowman ............... E02F 9/2841 403/379.5
5,066,070 A * 11/1991 Clarke ................ E01C 23/0926 173/13
5,145,237 A * 9/1992 Schulz ................... B25D 17/02 175/414
5,272,824 A * 12/1993 Cornelius ............. E02F 9/2825 37/456

(Continued)

*Primary Examiner* — Thanh K Truong
*Assistant Examiner* — David G Shutty
(74) *Attorney, Agent, or Firm* — Jaensson Law PLLC; Monika L. Jaensson, Esq.

(57) ABSTRACT

An assembly of a barrel adaptor and a hammer bit, and components thereof, for use with a hydraulic hammer. The barrel adaptor is coupled about the hammer bit by means of a pin, and includes a cylindrical body, a ledge formed between an upper segment and a lower segment of the cylindrical body, and a pair of apertures extending through opposing sides of the cylindrical body and aligned with a keyway of the hammer bit, through which the pin extends in coupling. A sleeve is movably secured about a portion of the upper segment of the cylindrical body. Affixed within the bottom of the cylindrical body are one or more steel plates, and at a distal end a nosepiece, with a tooth removably affixed to the nosepiece.

14 Claims, 4 Drawing Sheets

(56) References Cited

U.S. PATENT DOCUMENTS

| | | | | | |
|---|---|---|---|---|---|
| 5,724,756 | A * | 3/1998 | Gale | E02F 9/2841 | 37/456 |
| 5,944,120 | A * | 8/1999 | Barden | B25D 9/145 | 173/206 |
| 6,012,881 | A * | 1/2000 | Scheer | B23B 51/02 | 408/233 |
| 6,145,224 | A * | 11/2000 | Stickling | E02F 9/2825 | 37/456 |
| 6,557,653 | B2 * | 5/2003 | Hauptmann | E21B 4/06 | 175/414 |
| 6,938,961 | B2 * | 9/2005 | Broom | B25D 17/02 | 299/113 |
| 7,083,367 | B2 * | 8/2006 | Delett | B23B 51/00035 | 408/233 |
| 7,244,081 | B2 * | 7/2007 | Johnson | B23B 51/00 | 408/233 |
| 7,556,458 | B2 * | 7/2009 | Heilmann | B23B 29/03 | 408/233 |
| 9,095,968 | B2 * | 8/2015 | Kahra | E02F 3/966 | |
| 9,566,702 | B2 * | 2/2017 | Kuzma | B25D 17/005 | |
| 9,963,857 | B2 * | 5/2018 | Ruvang | E02F 9/2825 | |
| 11,389,916 | B1 * | 7/2022 | Moore | F16B 31/04 | |
| 2011/0198104 | A1 * | 8/2011 | Stockstill | B25D 17/02 | 173/128 |
| 2018/0133881 | A1 * | 5/2018 | Schley | B25B 13/08 | |
| 2022/0105619 | A1 * | 4/2022 | Lee | B25D 17/02 | |
| 2022/0324035 | A1 * | 10/2022 | DuMez | B25D 17/005 | |
| 2024/0335932 | A1 * | 10/2024 | Crane | B25D 17/02 | |

* cited by examiner

HAMMER BIT BARREL ADAPTOR

CROSS-REFERENCE TO RELATED APPLICATIONS

The present application claims priority to U.S. provisional patent application Ser. No. 63/495,158, filed Apr. 10, 2023, incorporated herein by this reference, in its entirety.

FIELD OF THE INVENTION

The disclosed technology regards a barrel adaptor with a replaceable tooth, a hammer bit useful with a barrel adaptor, and an assembly of a barrel adaptor and a hammer bit, all of which are useful in extending the life of a hammer bit.

BACKGROUND OF THE INVENTION

Hydraulic hammers are used with an excavator for demolishing concrete, asphalt and stone materials, by applying high pressure using hydraulic oil in its canister, with the piston converting kinetic energy into hammering energy at the hammer bit. The hammer bit is subject to damage in use, and often needs replacing, at great expense. Therefore, there is a need for an assembly that extends the working life of hammer bits used on hydraulic hammers.

The hammer bit barrel adaptor assembly of the disclosed technology extends the life of the hammer bit, while withstanding the 10,000 pound explosive energy and heat generated during operation of the hydraulic hammer.

BRIEF SUMMARY

Generally, the disclosed technology provides an assembly of a barrel adaptor and a hammer bit for use with a hydraulic hammer. The hammer bit includes a hammer interlock, an inverted ledge below the hammer interlock, and a keyway positioned on a portion of a side of the hammer bit, below the inverted ledge. The barrel adaptor is coupled about the hammer bit, and includes a cylindrical body, a ledge formed between an upper segment and a lower segment of the cylindrical body, and a pair of apertures extending through opposing sides of the cylindrical body and aligned with the keyway of the hammer bit. A sleeve is movably secured about a portion of the upper segment of the cylindrical body. Secured within the bottom of the cylindrical body are one or more steel plates, with a nosepiece affixed to the bottom of the cylindrical body, and a tooth removably affixed to the nosepiece.

The barrel adaptor is coupled with the hammer bit by means of a pin, wherein the pin traverses the apertures of the barrel adaptor and the keyway of the hammer bit. The inverted ledge of the hammer bit facilitates downward movement of the barrel adaptor while limiting upward movement of the barrel adaptor relative to the hammer bit, and the ledge of cylindrical body limits downward movement of the sleeve relative to the cylindrical body.

Further, the disclosed technology also provides a barrel adaptor useful with a hammer bit on a hydraulic hammer. Here a hammer bit may include a hammer interlock, an inverted ledge below the hammer interlock, and a keyway positioned on a portion of a side of the hammer bit, below the inverted ledge. This barrel adaptor includes a cylindrical body, with a ledge formed between upper and lower segments of the cylindrical body, and a pair of apertures extending through opposing sides of the cylindrical body, which apertures receive a pin useful in coupling the barrel adaptor with the hammer bit, at the keyway of the hammer bit. A sleeve is movably secured about a portion of the upper segment of the cylindrical body to retain the pin, and further to facilitate placement and removal of the pin to couple and decouple the barrel adaptor and the hammer bit, respectively. Secured within the bottom of the cylindrical body are one or more steel plates. Finally, a nosepiece is affixed to the bottom of the cylindrical body, with a tooth removably affixed to the nosepiece.

The disclosed technology also provides a hammer bit useful with a barrel adaptor on a hydraulic hammer. This hammer bit includes a hammer interlock, an inverted ledge below the hammer interlock, and a keyway positioned on a portion of a side of the hammer bit, below the inverted ledge. This keyway may be sized and positioned to receive a pin, through aligned apertures of the barrel adaptor, thereby facilitating the coupling of a barrel adaptor to the hammer bit.

BRIEF DESCRIPTION OF DRAWINGS

Reference will now be made to the attached drawings, when read in combination with the following detailed description, wherein like reference numerals refer to like parts throughout the several views, and in which.

DETAILED DESCRIPTION

Figure 1:
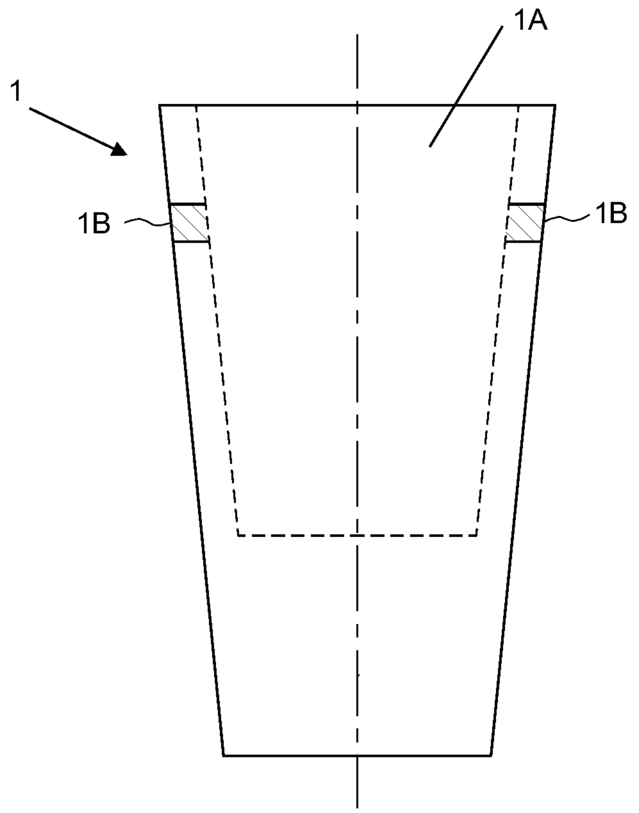
FIG. 1 shows an embodiment of a tooth useful in the disclosed technology.

The disclosed technology provides a barrel adapter 7 with a replaceable tooth 1, which can be installed on a hammer bit 4 of a hydraulic rock hammer. Further, the disclosed technology provides a hammer bit 4 of a hydraulic rock hammer useful with a barrel adapter 7. The disclosed technology also provides an assembly of a barrel adaptor 7 and a hammer bit 4 useful with a hydraulic rock hammer, coupled by means of a pin 6, thereby allowing limited movement of the bit within and relative to the barrel adaptor. For purposes of this disclosure, the symbol" is used to represent a measurement in inches.

For purposes of teaching the disclosed technology in the present application (but without limiting the scope of the invention), the adapter is specifically configured to be installed on an NPK-12 Hydraulic Rock Hammer. However, one skilled in the art would be easily able to adapt the teachings as herein provided for other commercially available or hereafter developed hydraulic hammers, and other sized (diameter and length) and shaped hammer bits.

Figure 4:
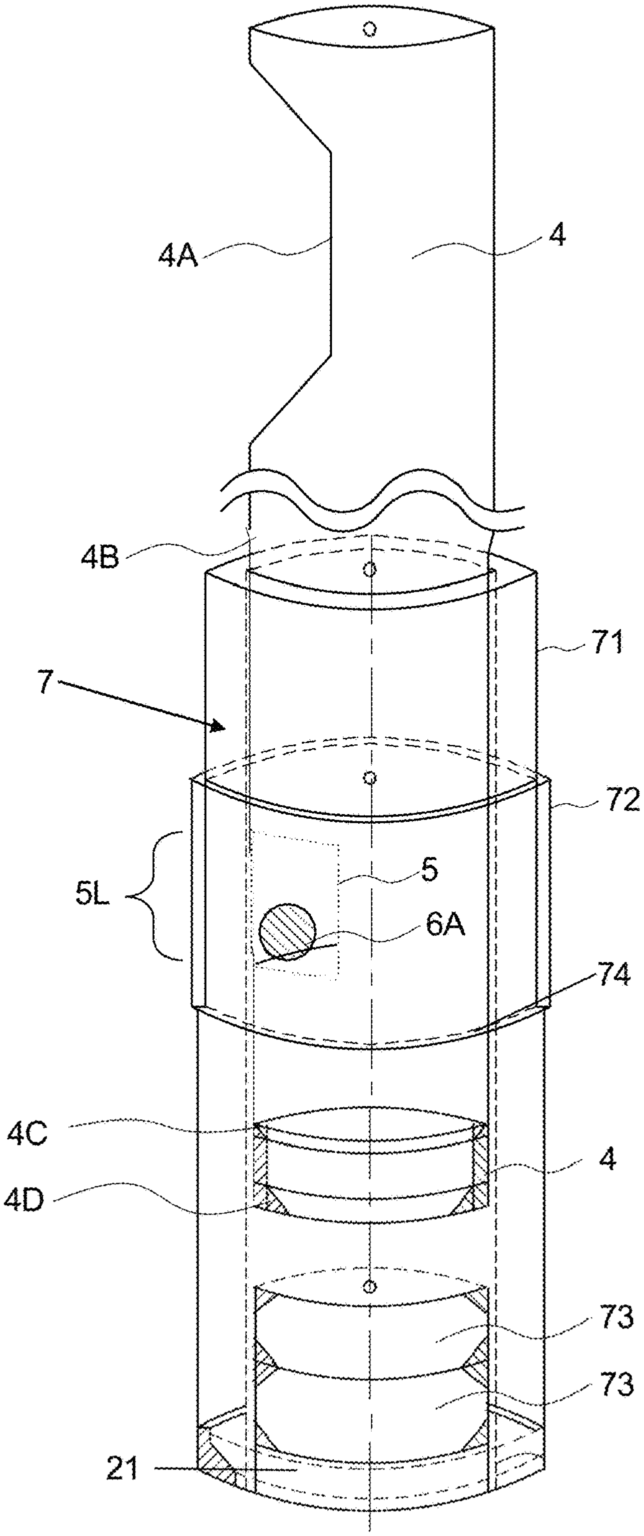
FIG. 4 shows an embodiment of the barrel adaptor coupled with a hammer bit of the disclosed technology.

As shown in FIG. 4, the barrel adaptor 7 of the disclosed technology comprises a steel cylindrical body 71, a sleeve 72 movably secured about an upper segment of the cylindrical body 71, and one or more steel plates 73 secured within the bottom of the barrel adaptor. A nosepiece 2 may be affixed to the bottom of the barrel adaptor, with a tooth 1 removably secured thereto.

The hammer bit 4 may be specifically designed for use with the barrel adaptor of the disclosed technology; alternatively, commercial, off the shelf hammer bits may be modified for such use. As shown in FIG. 4, a hammer bit 4 for an NPK-12 Hydraulic Rock Hammer, model GH12 is provided, having a 5.75" diameter at the top, with a hammer interlock 4A for removable affixation of the hammer bit to the hydraulic hammer. The bit then tapers to 5.5" diameter below the hammer interlock. This sloping inverted ledge 4B provided by this tapering diameter provides a constraining edge which in operation causes the barrel adaptor 7 of the disclosed technology to move downwards with the hammer bit when the tapering edge and the top of the barrel adaptor are in contact, while constraining upward movement of the barrel adaptor and its sleeve 72 as the hammer bit moves upwards.

Figure 7:
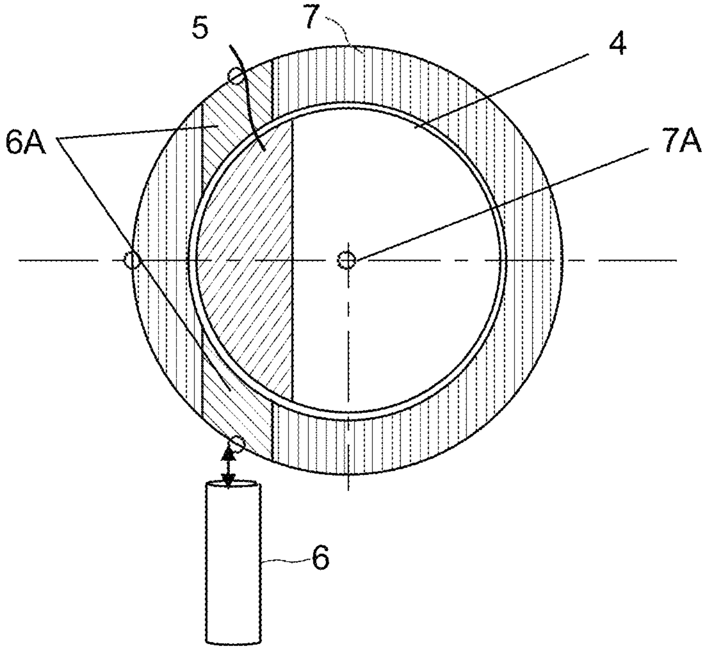
FIG. 7 shows an embodiment of apertures of the cylindrical body aligned with a keyway of a hammer bit, for receiving a pin to couple a barrel adaptor to a hammer bit in accordance with the teachings herein set forth.

To adapt the hammer bit for use with a barrel adaptor, and movably couple the two components, a keyway 5 is provided on the hammer bit (see FIGS. 4 and 7). This keyway should be positioned on the hammer bit so that its length 5L is positioned within the lower half of the upper segment of the cylindrical body when the barrel adaptor is coupled with the hammer bit. In the exemplary embodiment herein described, the keyway has a length of between about 2.5" and 3.5", or about 3", a depth of about 1¾", and is positioned between barrel adaptor elevations 11" and 14", wherein the barrel adaptor elevation is described beginning (0.00") at the bottom of the cylindrical body of the barrel adaptor.

Further, the distal end of the hammer bit may be tapered to a diameter of 4", and truncated to a length between the inverted ledge and the distal end of the hammer bit of 13-16". As shown in FIG. 4, a first ¼"×¼" tapering bevel 4C may be machined into the hammer bit at a first elevation, and a second ½"×½" tapering bevel 4D may be machined into the hammer bit at a lower elevation. In the exemplary embodiment herein described, the distal end of the hammer bit presents at about barrel adaptor elevation of 5.75", the second bevel presents between 5.75" and 6.25" barrel adaptor elevation, and the first tapering bevel presents between 7.25" and 7.5" barrel adaptor elevation. In some embodiments, the distal end of the hammer bit may present about 1¾" above the steel plates of the barrel adaptor, as hereinafter described, and/or may have a length (from the inverted ledge to the distal end) of about ¾ of the length of the barrel adaptor.

The cylindrical body 71 is sized to fit about the hammer bit as hereinabove described, with a clearance between the elements of about ⅛" (or less) to 1". In the exemplary embodiment herein described, the cylindrical body presents with a length of 19½", an inner diameter of 5¾", and a ¼" clearance between the interior side walls of the cylindrical body and the exterior side wall of the hammer bit.

A ledge or collar 74 is provided on the exterior of the cylindrical body, between the upper and lower segments, for purposes of maintaining the sleeve about the upper segment of the cylindrical body. This ledge may be formed through variations in wall thickness of the upper and lower segments of the cylindrical body. For example, the upper segment of the cylindrical body may have a first wall thickness of 1", and the lower segment of the cylindrical body may have a second wall thickness of 1¼", thereby forming a ¼" ledge. The wall thickness transition of the cylindrical body may be graduated (forming a sloped ledge), or immediate (forming a straight ledge). Continuing with the exemplary embodiment herein described, this transition may occur at 10" barrel adaptor elevation.

The bottom of the cylindrical body may be machined (milled) square (90°), with a ¾"×¾" bevel machined and milled on the bottom outside face of the cylindrical body, to facilitate a full penetration welded assembly with the nose piece nosepiece 2, as hereinafter described.

Movably positioned about the circumference and in the upper segment of the cylindrical body 71 is a sleeve 72. In the exemplary embodiment described herein, the sleeve is 5" tall with an inside diameter of 7¾"+0.0005" tolerance to allow the sleeve to slide freely when positioned on the cylindrical body 71, between the inverted ledge 4B of the hammer bit and the ledge or collar 74 the cylindrical body. The sliding sleeve may have a wall thickness of ¼" to ⅜".

Figure 5:
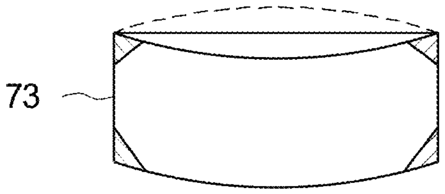
FIG. 5 shows an embodiment of an energy absorbing steel plate useful in the disclosed technology.

Secured near the distal end of the cylindrical body of the barrel adaptor are one or more energy absorbing round steel plates 73. In the embodiment shown, two 2" steel plates are provided, each presenting with a diameter of 5⅝", and a height of 2", having machined parallel faces at 90°, and a ½" bevel on all edges for fabrication installation and welding in the bottom of the cylinder body (see FIGS. 4 and 5).

Figure 6:
FIG. 6 shows an embodiment of the ends of a lock pin useful in the disclosed technology.

As shown in FIGS. 4, 6 and 7, the barrel adaptor is movably coupled with the hammer bit by means of a pin 6, and corresponding apertures 6A (offset from the central axis thereof) through the walls of the cylindrical body. When coupled, the pin extends through the apertures of the cylindrical body and keyway 5 of the hammer bit. In the exemplary embodiment, the apertures may be 1¼" in diameter, positioned at about elevation 11.6" of the barrel adaptor elevation. To facilitate removal of the pin and decouple the barrel adapter from the hammer bit, the pin may have a smaller diameter than the corresponding apertures (e.g., 1⅛" diameter). Further, acknowledging that because the apertures of the cylindrical body are offset from the central axis 7A, the ends of the pin are arced to correspond with the outside diameter of the cylindrical body, and not restrict the free travel of the sleeve up the cylindrical body. Thereby, as the hammer bit moves downward, the top edge of the keyway 5 causes the barrel adaptor to move downward; when the hammer bit moves upward, the barrel adaptor also moves upward when the bottom edge of the keyway contacts the pin. Notably, the apertures 6A of the cylindrical body and the aligned keyway 5 of the hammer bit should be positioned above the ledge or collar 74 of the cylindrical body. In this configuration, the sleeve 72 retains the pin 6 within the apertures 6A of the cylindrical body and the keyway 5 of the hammer bit, until removal of the barrel adaptor from the hammer bit is desired; then the sleeve may be slid up the cylindrical body to provide access to pin 6, for removal, and decoupling of the elements.

Figure 3:
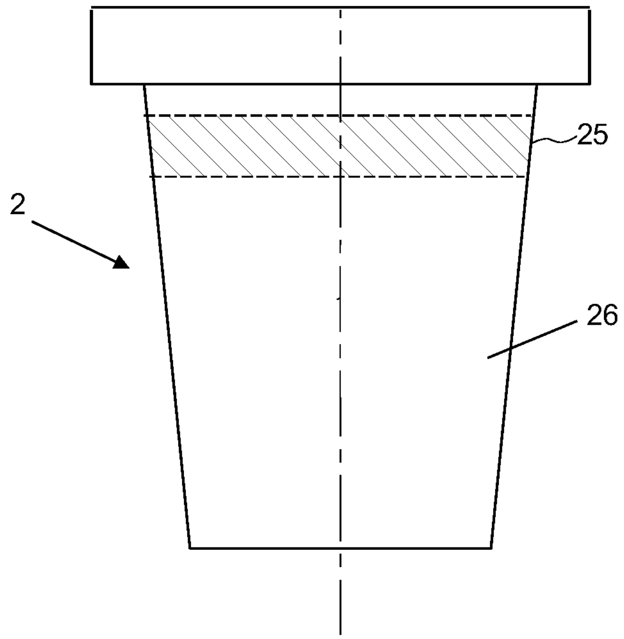
FIG. 3 shows an embodiment of a nosepiece useful in the disclosed technology.

Finally, a nosepiece 2 (as shown in FIG. 3) may be secured, by welding or otherwise, to the bottom of the cylindrical body (as shown in FIG. 4). Suitable nosepieces include Caterpillar standard tooth, Series J500, Part Number J550WN, wherein a 1" assembly hole 25 is bored through the nosepiece, and the top of the nosepiece is machined and milled to about 1¼" to create a true flat face.

Figure 2:
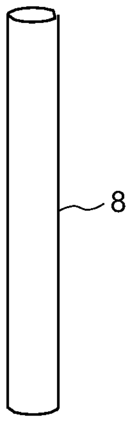
FIG. 2 shows an embodiment of an assembly pin useful to removably secure the nosepiece to the tooth of the barrel adaptor of the disclosed technology.

Removably coupled with the nosepiece is the tooth 1, which is sized and shaped to receive the body 26 of the nosepiece within its cavity. A suitable tooth includes Caterpillar series J460, Part Number 9N-4452, known as a bucket tip. Any ancillary structure presenting on the tip is removed, providing only the tooth 1, having a cavity 1A, and an aperture 1B through its side walls. An assembly pin 8 may then be inserted into the apertures 1B of the tooth and the aperture 25 of the nosepiece, to removably secure the tooth to the nosepiece. The assembly pin may be a 1.004" diameter×8" long machined steel pin, as shown in FIG. 2, to secure the tooth to the nosepiece.

The foregoing detailed description includes specific dimensions and elevations, as also shown in the drawings, and are intended for a particular exemplary embodiment, using modified commercial, off the shelf, components. Alternatively, any or all of the disclosed components may be specifically manufactured for purposes of the disclosed technology, in accordance with the teachings herein. Further, it would be clear to a person skilled in the art that the dimensions and elevations would and should be modified for purposes of using different sized bits. For these reasons, the specific dimensions and elevations should be considered illustrative but not imperative.

For purposes of this disclosure and the appended claims, the term "about" references a variation of 0.5".

The invention claimed is:

1. An assembly of a barrel adaptor and a hammer bit for use with a hydraulic hammer, the assembly comprising:

a hammer bit comprising a hammer interlock, an inverted ledge below the hammer interlock, and a keyway positioned on a portion of a side of the hammer bit, below the inverted ledge; and a barrel adaptor coupled about the hammer bit, the barrel adaptor comprising a cylindrical body, a ledge formed between an upper segment and a lower segment of the cylindrical body, a pair of apertures extending through opposing sides of the cylindrical body and aligned with the keyway of the hammer bit, a sleeve movably secured about a portion of the upper segment of the cylindrical body, one or more steel plates secured within the bottom of the cylindrical body, a nosepiece affixed to the bottom of the cylindrical body, and a tooth removably affixed to the nosepiece;

wherein the barrel adaptor is coupled with the hammer bit by means of a pin, wherein the pin traverses the pair of apertures of the barrel adaptor and the keyway of the hammer bit; and wherein the inverted ledge of the hammer bit facilitates downward movement of the barrel adaptor while limiting upward movement of the barrel adaptor relative to the hammer bit, and the ledge of cylindrical body limits downward movement of the sleeve relative to the cylindrical body.

2. The assembly of claim 1, wherein the pair of apertures of the barrel adaptor and the keyway of the hammer bit align within a lower half of the upper segment of the cylindrical body.

3. The assembly of claim 2, wherein the pair of apertures of the cylindrical body are offset from a central axis of the cylindrical body.

4. The assembly of claim 3, wherein ends of the pin are arced to correspond with exterior walls of the cylindrical body presenting about the pair of apertures, thereby facilitating free travel of the sleeve about the cylindrical body.

5. The assembly of claim 1, wherein the ledge of the cylindrical body presents as a result of differing wall widths of the upper segment and the lower segment of the cylindrical body.

6. The assembly of claim 5, wherein the distal end of the hammer bit is tapered by means of a pair of bevels, a first bevel at a first elevation, and a second bevel at a lower elevation than the first elevation.

7. The assembly of claim 1, wherein the distal end of the hammer bit presents at least about 1¾ inches above the one or more steel plates of the barrel adaptor.

8. The assembly of claim 1, wherein the tooth is removably affixed to the nosepiece by means of an assembly pin, secured through corresponding and aligned apertures of the nosepiece and the tooth.

9. A barrel adaptor useful with a hammer bit on a hydraulic hammer, wherein the hammer bit comprises a hammer interlock, an inverted ledge below the hammer interlock, and a keyway positioned on a portion of a side of the hammer bit, below the inverted ledge, the barrel adaptor comprising:

a cylindrical body, with a ledge formed between an upper segment and a lower segment of the cylindrical body, and a pair of apertures extending through opposing sides of the cylindrical body;

a sleeve movably secured about a portion of the upper segment of the cylindrical body;

one or more steel plates secured within the bottom of the cylindrical body;

a nosepiece affixed to the bottom of the cylindrical body;

a tooth removably affixed to the nosepiece; and a pin for removably coupling the cylindrical body to a hammer bit when the pin is inserted through the pair of apertures of the cylindrical body and a keyway of the hammer bit.

10. The barrel adaptor of claim 9, wherein the pair of apertures of the cylindrical body present within a lower half of the upper segment of the cylindrical body.

11. The barrel adaptor of claim 10, wherein the pair of apertures of the cylindrical body are offset from a central axis of the cylindrical body.

12. The barrel adaptor of claim 11, wherein ends of the pin are arced to correspond with exterior walls of the cylindrical body presenting about the pair of apertures, thereby facilitating free travel of the sleeve about the cylindrical body.

13. The barrel adaptor of claim 9, wherein the ledge of the cylindrical body presents as a result of differing wall widths of the upper segment and the lower segment of the cylindrical body.

14. The barrel adaptor of claim 9, wherein the tooth is removably affixed to the nosepiece by means of an assembly pin, secured through corresponding and aligned apertures of the nosepiece and the tooth.

* * * * *